United States Patent [19]
Pachauri

[11] Patent Number: 6,005,571
[45] Date of Patent: Dec. 21, 1999

[54] GRAPHICAL USER INTERFACE FOR MANAGING SECURITY IN A DATABASE SYSTEM

[75] Inventor: Kush Pachauri, Cupertino, Calif.

[73] Assignee: Softline, Inc., San Jose, Calif.

[21] Appl. No.: 08/940,845

[22] Filed: Sep. 30, 1997

[51] Int. Cl.[6] .............................. G06F 3/00; G06F 17/30
[52] U.S. Cl. ......................... 345/339; 345/331; 345/352; 707/10; 707/9
[58] Field of Search .................................... 345/329, 330, 345/331, 333, 335, 348, 352; 707/8, 9, 10

[56] References Cited

U.S. PATENT DOCUMENTS

| | | | |
|---|---|---|---|
| 5,555,369 | 9/1996 | Menendez et al. | 345/335 |
| 5,644,737 | 7/1997 | Turnerman et al. | 345/352 |
| 5,644,739 | 7/1997 | Moursund | 345/354 |
| 5,752,242 | 5/1998 | Havens | 707/10 X |
| 5,764,226 | 6/1998 | Consolatti et al. | 345/333 |
| 5,862,372 | 1/1999 | Morris et al. | 345/335 |

FOREIGN PATENT DOCUMENTS

| | | | |
|---|---|---|---|
| 0 697 662 A1 | 2/1996 | European Pat. Off. | G06F 1/00 |
| WO 96/17286 | 6/1996 | WIPO | G06F 1/00 |

OTHER PUBLICATIONS

Authorizations Made Easy: Chapter 1, R/3 System–Security and Authorization Concept, Policies and Procedures, pp. 1–27, 1997.

*Primary Examiner*—Raymond J. Bayerl
*Assistant Examiner*—Chadwick A. Jackson
*Attorney, Agent, or Firm*—Pack & Vaughan LLP

[57] ABSTRACT

One embodiment of the present invention provides a method for managing security in a database system. The method includes producing a plurality of task groups, the task groups including actions that may be performed on the database. Functional roles are created from these task groups, and a security profile for a user is created by assigning to the user at least one functional role. In one embodiment, the security profile for a user may only be created by assigning functional roles to users. Thus, users may only perform actions on the database that are dictated by defined task groups and functional roles. This allows database security to be controlled by controlling definitions of task groups and functional roles, without requiring exhaustive examination of security profiles for large numbers of individual users.

26 Claims, 14 Drawing Sheets

```
FUNCTIONAL ROLES CONFIGURATION
SYSTEM  HELP
CREATE | CHANGE | COPY | DELETE | SAVE
FUNCTIONAL ROLES ==>      M=ERSUPBUY   M=ERBUYER  M=ERPURMGR

TASK GROUPS
  ├─[-] MATERIALS MANAGEMENT  ◯●◯ ☐   ◯●◯ ☐   ◯●◯ ☐
  │  ├─[+] INVENTORY MGMT      ●◯◯ ☐   ●◯◯ ☐   ●◯◯ ☐
  │  ├─[-] PURCHASING          ◯●◯ ☐   ◯●◯ ☐   ◯●◯ ☐
  │  │  ├─[+] AGRCREATE        ●◯◯ ☐   ●◯◯ ☐   ◯◯● [x]
  │  │  ├─[+] PIRCREATE        ●◯◯ ☐   ●◯◯ ☐   ◯◯● [x]
  │  │  ├─ PIRDISP             ◯◯● [x] ●◯◯ ☐   ●◯◯ ☐
  │  │  ├─ POCREATE            ●◯◯ ☐   ◯◯● [x] ●◯◯ ☐
  │  │  ├─[+] PODISP           ◯◯● [x] ◯◯● [x] ●◯◯ ☐
  │  │  ├─ PORELEAS            ●◯◯ ☐   ●◯◯ ☐   ◯◯● [x]
  │  │  ├─[+] PRQCREAT         ●◯◯ ☐   ◯◯● [x] ●◯◯ ☐
  │  │  ├─ PRQRELES            ●◯◯ ☐   ●◯◯ ☐   ●◯◯ ☐
  │  │  ├─ PUMSCOND            ●◯◯ ☐   ●◯◯ ☐   ●◯◯ ☐
  │  │  ├─ QUOTE               ●◯◯ ☐   ◯◯● [x] ●◯◯ ☐
  │  │  ├─ RFQCREAT            ●◯◯ ☐   ◯◯● [x] ●◯◯ ☐
  │  │  └─ VENMSCRT            ●◯◯ ☐   ◯◯● [x] ●◯◯ ☐
  │  ├─[+] INVOICE VERIFICATION ●◯◯ ☐  ●◯◯ ☐   ●◯◯ ☐
  │  ├─ SERVICE ENTRY          ●◯◯ ☐   ●◯◯ ☐   ●◯◯ ☐
  │  ├─ VALUATION              ●◯◯ ☐   ●◯◯ ☐   ●◯◯ ☐
  │  ├─[+] WAREHOUSE MGMT      ●◯◯ ☐   ●◯◯ ☐   ●◯◯ ☐
  │  └─[+] MATERIALS PLANNING  ●◯◯ ☐   ●◯◯ ☐   ●◯◯ ☐
```

```
BUSINESS FUNCTIONS HIERARCHY
|
|--  00032 LOGISTICS
|   |--   00033 MATERIALS MANAGEMENT
|   |   |--   00034 INVENTORY MANAGEMENT
|   |   |--   00035 PURCHASING
|   |   |--   00036 INVOICE VERIFICATION
|   |   |--   00039 SERVICE ENTRY
|   |   |--   00040 VALUATION
|   |   |--   00043 WAREHOUSE MANAGEMENT
|   |   |--   00044 MATERIALS PLANNING
|   |   |--   00047 PHYSICAL INVENTORY
|   |   |--   00048 MATERIAL MASTER
|   |   |--   00049 ENVIRONMENT DATA
|   |   |--   00050 SERVICE MASTER
|   |--   00052 SALES/DISTRIBUTION
|   |   |--   00053 MASTER DATA
|   |   |--   00054 SALES SUPPORT
|   |   |--   00055 SALES
|   |   |--   00056 SHIPPING
|   |   |--   00057 TRANSPORTATION
|   |   |--   00058 BILLING
|   |   |--   00059 FOREIGN TRADE
|   |   |--   00060 SALES INFO SYSTEM
|   |--   00061 PRODUCTION
|   |   |--   00062 MASTER DATA
|   |   |--   00072 SOP
|   |   |--   00073 MASTER PLANNING
|   |   |--   00078 MRP
|   |   |--   00079 PRODUCTION CONTROL
|   |   |--   00080 CAPACITY PLANNING
|   |   |--   00081 REPETITIVE MFG
|   |   |--   00082 KANBAN
|   |   |--   00083 PRODUCT COSTING
|   |--   00084 PRODUCTION - PROCESS
|   |   |--   00085 MASTER DATA
|   |   |--   00090 SOP
|   |   |--   00091 MASTER PLANNING
|   |   |--   00096 MRP
|   |   |--   00097 PROCESS ORDER
|   |   |--   00098 PROCESS PLANNING
|   |   |--   00099 PROCESS MANAGEMENT
|   |   |--   00100 PRODUCT COSTING
|   |--   00101 PLANT MAINTENANCE
|   |   |--   00102 TECHNICAL OBJECTS
|   |   |--   00103 WORK CENTERS
|   |   |--   00104 MAINT. TASK LISTS
|   |   |--   00105 MAINTENANCE PLANNING
|   |   |--   00106 PM PROCESSING
|   |   |--   00107 INFORMATION SYSTEM
|--  00151 ACCOUNTING
|   |--   00152 FINANCIAL ACCOUNTING
|   |   |--   00153 GENERAL LEDGER
|   |   |--   00154 ACCOUNTS RECEIVABLE
|   |   |--   00155 ACCOUNTS PAYABLE
|   |   |--   00156 FIXED ASSETS
|   |   |--   00157 CONSOLIDATION
|   |   |--   00158 SPEC. PURPOSE LEDGER
```

FIG. 11

| TASK GROUPS CONFIGURATION | | | | | | | |
|---|---|---|---|---|---|---|---|
| GOTO  SYSTEM  HELP | | | | | | | |
| CREATE | CHANGE | COPY | DELETE | SAVE | | | |
| TASK GROUPS ==> | | | | M:POCREATE | M:PODISPLAY | M:TGCREATE | |
| PURCHASING | | ○●○ | ☐ | ○●○ | ☐ | ●○○ | ☐ |
| — PURCHASE ORDER | | ○○● | ☒ | ●○○ | ☐ | ●○○ | ☐ |
|   — CREATE | | ○○● | ☒ | ●○○ | ☐ | ●○○ | ☐ |
|   — CHANGE | | ○○● | ☒ | ○○● | ☒ | ●○○ | ☐ |
|   — DISPLAY | | ○○● | ☒ | ●○○ | ☐ | ●○○ | ☐ |
|   — MAINTAIN SUPPLEMENT | | ○○● | ☒ | ●○○ | ☐ | ●○○ | ☐ |
|   — RELEASE | | ○○● | ☒ | ○○● | ☒ | ●○○ | ☐ |
|   — LIST DISPLAYS | | ○○● | ☒ | ○○● | ☒ | ●○○ | ☐ |
|   — REPORTING | | ○○● | ☒ | ●○○ | ☐ | ●○○ | ☐ |
|   — SHIPPING NOTIF. | | ○○● | ☒ | ●○○ | ☐ | ●○○ | ☐ |
|   — FOLLOW-ON FUNCT. | | ○○● | ☒ | ○○● | ☒ | ●○○ | ☐ |
|   — MESSAGES | | ●○○ | ☐ | ●○○ | ☐ | ●○○ | ☐ |
| — REQUISITION | | ●○○ | ☐ | ●○○ | ☐ | ○●○ | ☐ |
| — OUTLINE AGREEMENT | | ●○○ | ☐ | ●○○ | ☐ | ●○○ | ☐ |
| — RFQ/QUOTATION | | ○●○ | ☐ | ●○○ | ☐ | ○●○ | ☐ |
| — MASTER DATA | | ●○○ | ☐ | ●○○ | ☐ | ●○○ | ☐ |
|   — INFO RECORD | | ●○○ | ☐ | ●○○ | ☐ | ●○○ | ☐ |
|   — SOURCE LIST | | ●○○ | ☐ | ●○○ | ☐ | ●○○ | ☐ |
|   — QUOTA ARRANGEMENT | | ●○○ | ☐ | ●○○ | ☐ | ○○● | ☒ |
|   — VENDOR | | ●○○ | ☐ | ●○○ | ☐ | ●○○ | ☐ |
|   — VENDOR EVALUATION | | | | | | | |

FIG. 12

| FUNCTIONAL ROLES CONFIGURATION | | | | | | | | |
|---|---|---|---|---|---|---|---|---|
| SYSTEM   HELP | | | | | | | | |
| CREATE | CHANGE | COPY | DELETE | SAVE | | | | |
| FUNCTIONAL ROLES ==> | | | M=ERSUPBUY | | M=ERBUYER | | M=ERPURMGR | |

| TASK GROUPS | ERSUPBUY | | ERBUYER | | ERPURMGR | |
|---|---|---|---|---|---|---|
| ─ MATERIALS MANAGEMENT | ○●○ | ☐ | ○●○ | ☐ | ○●○ | ☐ |
|       + INVENTORY MGMT | ●○○ | ☐ | ●○○ | ☐ | ●○○ | ☐ |
|       − PURCHASING | ○●○ | ☐ | ○●○ | ☐ | ○●○ | ☐ |
|             + AGRCREATE | ●○○ | ☐ | ●○○ | ☐ | ○○● | ☒ |
|             + PIRCREATE | ●○○ | ☐ | ●○○ | ☐ | ○○● | ☒ |
|                PIRDISP | ○○● | ☒ | ●○○ | ☐ | ●○○ | ☐ |
|                POCREATE | ●○○ | ☐ | ○○● | ☒ | ●○○ | ☐ |
|             + PODISP | ○○● | ☒ | ○○● | ☒ | ●○○ | ☐ |
|                PORELEAS | ●○○ | ☐ | ●○○ | ☐ | ○○● | ☒ |
|             + PRQCREAT | ●○○ | ☐ | ○○● | ☒ | ●○○ | ☐ |
|                PRQRELES | ●○○ | ☐ | ●○○ | ☐ | ●○○ | ☐ |
|                PUMSCOND | ●○○ | ☐ | ●○○ | ☐ | ●○○ | ☐ |
|                QUOTE | ●○○ | ☐ | ○○● | ☒ | ●○○ | ☐ |
|                RFQCREAT | ●○○ | ☐ | ○○● | ☒ | ●○○ | ☐ |
|                VENMSCRT | ●○○ | ☐ | ○○● | ☒ | ●○○ | ☐ |
|       + INVOICE VERIFICATION | ●○○ | ☐ | ●○○ | ☐ | ●○○ | ☐ |
|          SERVICE ENTRY | ●○○ | ☐ | ●○○ | ☐ | ●○○ | ☐ |
|          VALUATION | ●○○ | ☐ | ●○○ | ☐ | ●○○ | ☐ |
|       + WAREHOUSE MGMT | ●○○ | ☐ | ●○○ | ☐ | ●○○ | ☐ |
|       + MATERIALS PLANNING | ●○○ | ☐ | ●○○ | ☐ | ●○○ | ☐ |

FIG. 13

| USER FUNCTION ROLES ASSIGNMENT | | | | | | | |
|---|---|---|---|---|---|---|---|
| SYSTEM   HELP | | | | | | | |
| CREATE | CHANGE | COPY | DELETE | SAVE | | | |
| USERS ==> | | | USER1 | | USER2 | | USER3 |
| FUNCTION ROLES HIERARCHY | | | | | | | |
| [-] MATERIALS MANAGEMENT | | | ○●○ ☐ | | ○●○ ☐ | | ○●○ ☐ |
| ERBUYER | | | ○○● [x] | | ○○● [x] | | ○○● [x] |
| ERGPRPUR | | | ○○● [x] | | ○○● [x] | | ●○○ ☐ |
| ERPURMGR | | | ●○○ ☐ | | ●○○ ☐ | | ●○○ ☐ |
| ERREQNER | | | ○○● [x] | | ●○○ ☐ | | ●○○ ☐ |
| ERREQREL | | | ○○● [x] | | ●○○ ☐ | | ●○○ ☐ |
| ERSUPBUY | | | ○○● [x] | | ●○○ ☐ | | ●○○ ☐ |
| SALES & DISTRIBUTION | | | ●○○ ☐ | | ●○○ ☐ | | ●○○ ☐ |
| PRODUCTION PLANNING | | | ●○○ ☐ | | ●○○ ☐ | | ●○○ ☐ |
| LOGISTICS - GENERAL | | | ●○○ ☐ | | ●○○ ☐ | | ●○○ ☐ |
| [-] FINANCIALS | | | ○●○ ☐ | | ○●○ ☐ | | ○●○ ☐ |
| EBCLKEMP | | | ○○● [x] | | ●○○ ☐ | | ●○○ [x] |
| EBCLKRMT | | | ○○● [x] | | ●○○ ☐ | | ○○● ☐ |
| EBCLKSUB | | | ●○○ ☐ | | ○○● [x] | | ●○○ ☐ |
| EBCLKUTL | | | ●○○ ☐ | | ●○○ ☐ | | ●○○ ☐ |
| EPYBLCRD | | | ●○○ ☐ | | ●○○ ☐ | | ●○○ ☐ |
| EPYBLMGR | | | ○○● [x] | | ●○○ ☐ | | ●○○ ☐ |
| HUMAN RESOURCES | | | ●○○ ☐ | | ●○○ ☐ | | ●○○ ☐ |
| [+] BASIS | | | ○●○ ☐ | | ●○○ ☐ | | ●○○ ☐ |

FIG. 14

GRAPHICAL USER INTERFACE FOR MANAGING SECURITY IN A DATABASE SYSTEM

RELATED APPLICATION

This application hereby incorporates by reference the following related non-provisional application by the same inventor as the instant application, which was filed on the same day as the instant application: "Method for Managing Security in a Database System," having Ser. No. 08/940,495, filed Sep. 30, 1997.

BACKGROUND

1. Field of the Invention

The present invention relates to computerized database systems, and more particularly to a method and an apparatus for modularizing security profiles for users of an enterprise resource planning system including a database, wherein the security profiles specify actions that the user is allowed to perform on the database.

2. Related Art

Almost every function performed by a business can be more effectively managed by using an enterprise resource planning system (ERP) to keep track of data associated with the function. ERPs are presently used to keep track of business functions such as finances, taxes, inventory, payroll, planning. Some ERPs additionally allow sharing of data across organizational units, which can greatly improve information flow through a company. However, providing such sharing can significantly complicate the process of ensuring security for the underlying database system. (Note that ERPs store data in underlying databases, and the term ERP is used interchangeably with the term database in this specification.)

This problem is complicated by the common use of distributed computing systems to implement ERPs within corporations. These distributed computing systems spread out computational and data storage resources across computer networks to a large number of geographically separate computing nodes. Consequently, a distributed computing system exposes sensitive data to greater risk of loss, unauthorized modification and unauthorized access than exists in a more centralized computing system.

Techniques presently used to provide security in ERPs (database systems) are not well adapted to control security in such readily accessible and widely distributed database systems. Some existing security systems implement security by providing a security profile for each user of the database system. A security profile specifies certain actions (or activity types) that a user is allowed to perform on the database. Each user is assigned a specific security profile, and each user is only allowed to perform the actions specified in the security profile.

System administrators are typically given the responsibility to create and assign security profiles. This procedure involves significant risks in a distributed computing environment, where potentially hundreds of system administrators, located at different sites within a corporation, are charged with the task of assigning security profiles to users. It becomes almost impossible to exercise control over security in such an environment without unreasonably hindering access to the database system. A system administrator in a small branch office can potentially give a low-level clerk access to the secret corporate information.

Furthermore, without some centralized system for security control it is almost impossible to exercise control over security for a particular business area or a particular business function. In order to determine what users have access to a particular type of information, it may be necessary to scan through security profiles for all users across all nodes of a distributed system.

Additionally, the task of managing security is presently in the hands of system administrators, who maintain system security by deciphering cryptic information and inputting cryptic commands into a database security system. Business managers, who are not familiar with this cryptic information, cannot readily oversee the work of security administrators. Thus, a critical oversight function is lacking.

What is needed is a security system for a database system that allows database security to be controlled within each organizational unit of a business, while at the same time allowing accesses by users across business area boundaries.

Additionally, what is needed is a system for maintaining database security that allows a business manager to effectively visualize and manipulate database security without extensive training in cryptic computer formats and commands.

SUMMARY

One embodiment of the present invention provides a method for managing security in a database system. The method includes producing a plurality of task groups, the task groups including actions that may be performed on the database. Functional roles are created from these task groups, and a security profile for a user is created by assigning to the user at least one functional role. In one embodiment, the security profile for a user may only be created by assigning functional roles to users. Thus, users may only perform actions on the database that are dictated by defined task groups and functional roles. This allows database security to be controlled by controlling definitions of task groups and functional roles, without requiring exhaustive examination of security profiles for large numbers of individual users.

In another embodiment of the present invention, producing a task group includes receiving a task group description, including a task group name, and displaying a plurality of actions that may be performed on the database. It also includes receiving selections from the displayed actions, and producing a task group from the task group description and the selected actions. In a variation on this embodiment, the displayed actions are related to a single business activity.

In another embodiment of the present invention, producing the security profile for the user includes displaying functional roles, and receiving a selection of at least one functional role from the displayed functional roles. It also includes producing the security profile for the user including the selected functional roles.

In yet another embodiment of the present invention, producing a task group includes specifying organizational units within a business that the task group may operate on.

One embodiment of the present invention can be characterized as a method for managing a security system within a database. The method includes designing a security profile for a user of the database specifying actions the user of the database is allowed to perform on the database, and implementing the security profile in the database, so that the user is allowed to perform the specified actions. It also includes validating the implementation of the security profile in the database by comparing the design of the security profile with the implementation of the security profile in the database.

Another embodiment of the present invention can be characterized as a graphical user interface for manipulating task groups, wherein task groups include actions that may be performed on a database system. The graphical user interface includes a graphical display, and a first activation point on the graphical display for activating creation of a task group. It also includes a second activation point on the graphical display, for activating changes to a task group, and a display within the graphical display, for displaying a plurality of actions that may be performed on the database. This display includes activation points for selecting actions from the displayed actions to be included in the task group.

Another embodiment of the present invention can be characterized as a graphical user interface for manipulating a functional role for users of a database system, which include actions that may be performed on a database system. The graphical user interface includes a graphical display, and a first activation point on the graphical display, for activating creation of a functional role. It also includes a second activation point on the graphical display, for activating changes to a functional role, and a display of task groups within the graphical display, the task groups specifying actions that may be performed on the database. This display includes activation points for selecting task groups from the display of task groups to be included in the functional role.

DESCRIPTION OF THE FIGURES

FIG. 11 is a diagram illustrating an example of a business functions hierarchy in accordance with an embodiment of the present invention.

FIG. 12 is a diagram illustrating a graphical user interface screen for producing task groups in accordance with an embodiment of the present invention.

FIG. 13 is a diagram illustrating a graphical user interface screen for producing functional roles in accordance with an embodiment of the present invention.

FIG. 14 is a diagram illustrating a graphical user interface screen for producing functional roles in accordance with an embodiment of the present invention.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Database System

Figure 1:
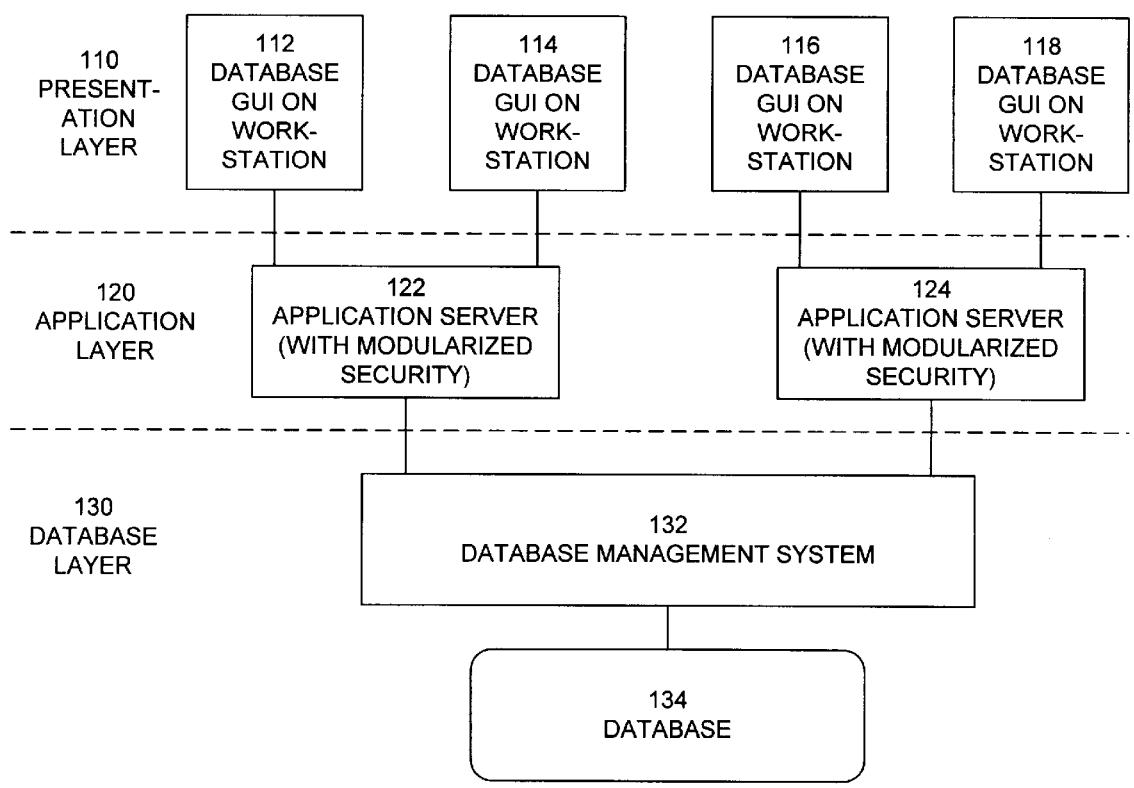
FIG. 1 is a block diagram illustrating some of the major functional components of a client-server-based database system in accordance with an embodiment of the present invention.

FIG. 1 is a block diagram illustrating some of the major functional components of a client-server-based database system in accordance with an embodiment of the present invention. The illustrated system includes three layers: presentation layer 110, application layer 120 and database layer 130. Presentation layer 110 includes a plurality of graphical user interfaces (GUIs) through which users access database 134. These include database GUIs 112, 114, 116 and 118. In one embodiment, GUIs 112, 114, 116 and 118 reside on workstations. In another embodiment, GUIs 112, 114, 116 and 118 reside on personal computers. In general, GUIs 112, 114, 116 and 118 can reside on any computational system with a graphical user interface that is linked to database 134.

GUIs 112, 114, 116 and 118 are coupled to application servers 122 and 124 within application layer 120. In the illustrated embodiment, GUIs 112 and 114 are coupled to application server 122, and GUIs 116 and 118 are coupled to application server 124. Application servers 122 and 124 implement the applications required to provide security on the underlying database system, in doing so they communicate and process information between data GUIs 112, 114, 116 and 118 and database system 132. In one embodiment, application servers 122 and 124 provide modularized security through a set of mechanisms described in the following pages. Application servers 122 and 124 may be located at a number of locations in a distributed computing system, including at remote workstations or personal computers, or at a computational server or a database server.

Application servers 122 and 124 are coupled to database management system 132 within the database layer 130. Database management system 132 can be any type of custom-made or commercially available database system for managing storage and retrieval of data. In one embodiment, database management system 132 includes a SAP database management system. Database management system 132 is coupled with database 134. Database 132 can be any type of database system in which data can be stored and retrieved. This includes, but is not limited to, hierarchical databases and relational databases.

The system illustrated in FIG. 1 operates as follows. Users input commands into database GUIs 112, 114, 116 and 118. These commands flow into application servers 122 and 124, which process these commands and translate them into database commands for database management system 132. Database management system 132 processes the database commands and performs the specified operations on database. Data can also flow in the opposite direction, from database 134, through database management system 132 and application servers 122 and 124 for display on GUIs 112, 114, 116 and 118.

FIG. 1 illustrates an embodiment of the present invention that is housed in a distributed computing system. However, the present invention can be applied to any computing system through which a plurality of system users can access a database. This includes databases on centralized computing systems as well.

Description of Security Management System

Figure 2:
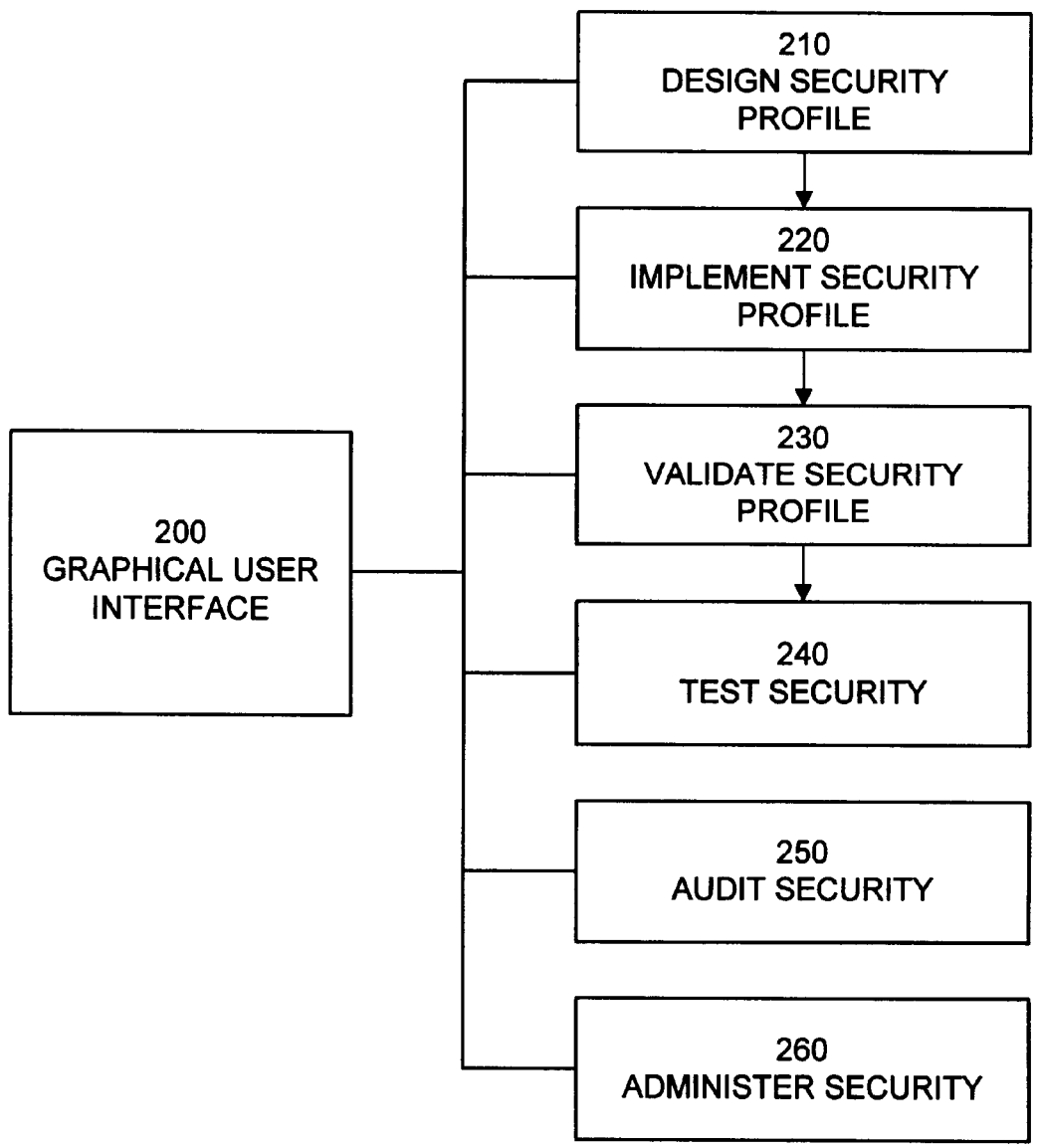
FIG. 2 is a block diagram illustrating some of the major functional components of a system for managing database security in accordance with an embodiment of the present invention.

FIG. 2 is a block diagram illustrating some of the major functional components of a system for managing database security in accordance with an embodiment of the present invention. The system illustrated in FIG. 2 includes graphical user interface 200, which is coupled with a plurality of modules that perform various security functions. Design security profile module 210 includes mechanisms that can be used to design a security profile for a user of a database system. Implement security profile module 220 includes a mechanism that can be used to implement a security profile in a data base system. In one embodiment, the present invention operates on a SAP database, and implement security profile module 220 includes a SAP profile generation tool. Validate security profile module 230 includes a mechanism to validate that a security profile is properly implemented on a database. Test security module 240 includes resources to test the security of a database. This includes positive testing, which ensures that a database user can perform actions that are included in the user's security profile, as well as negative testing, which ensures that the user cannot perform actions that are not included in the user's activity profile. Audit security module 250 includes tools that allow a security administrator to determine what users are allowed to perform specific functions on the database. Administer security module 260 includes tools to perform day-to-day troubleshooting of security on the database system.

In the illustrated embodiment, the above-described modules operate under control of graphical user interface 200, through which a security administrator can selectively operate the modules. In order to set up security in a database system, a security administrator will typically operate the modules in the sequence specified by the arrows in FIG. 2. Security profiles are first designed 210, and then implemented 220. Next, they are validated to ensure that the profiles are properly implemented. Finally, the database system is tested to ensure that security is operating properly. Audit security module 240 and the administer security module 260 are periodically operated by a security administrator to audit and administer security for the database system. In another embodiment, the above-described modules are stand-alone programs that are not tied together by a graphical user interface. Yet another embodiment includes some, but not all, of the above-described modules.

Figure 3:
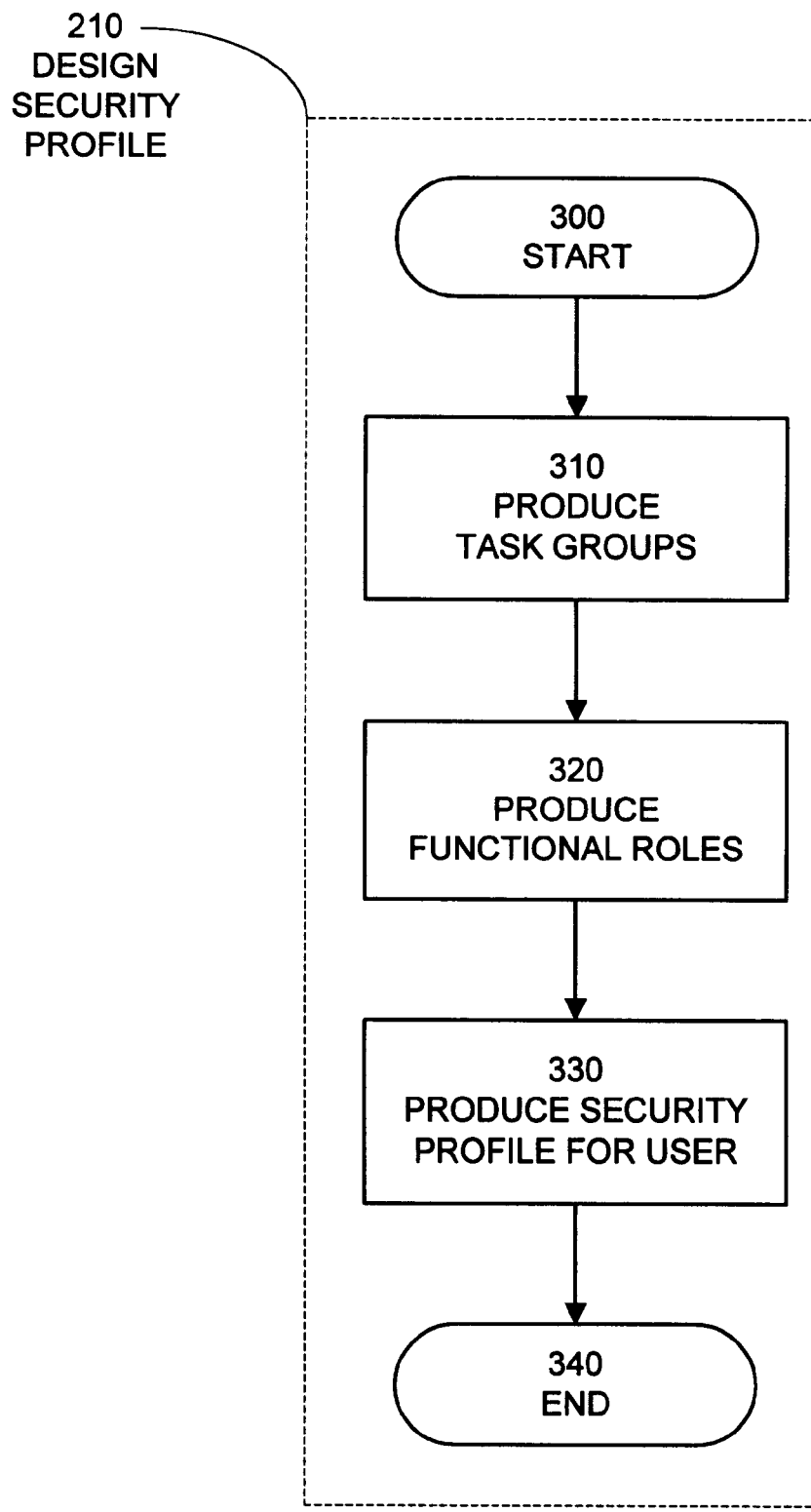
FIG. 3 is a flow chart illustrating some of the operations involved in designing a security profile in accordance with an embodiment of the present invention.

FIG. 3 is a flow chart illustrating some of the operations involved in designing a security profile, as performed by design security profile module 210 in FIG. 2, in accordance with an embodiment of the present invention. The system starts at state 300, which is a start state. The system next proceeds to state 310. At state 310, the system creates task groups, including actions that may be performed on the database. In one embodiment, actions included in a single functional role are restricted to a single business area In another embodiment, actions within a single functional role originate from the same SAP menu. The system next proceeds to state 320. At state 320, the system creates functional roles, including at least one task group. In one embodiment, these functional roles can span multiple business areas. The system next proceeds to state 330. At state 330, the system produces a security profile for a user including at least one functional role. In one embodiment, security profiles for users may only be created using functional roles, and security profiles for users may only be modified by changing functional role assignments or by changing the underlying functional roles themselves. The system next proceeds to state 340, which is an end state.

Figure 4:
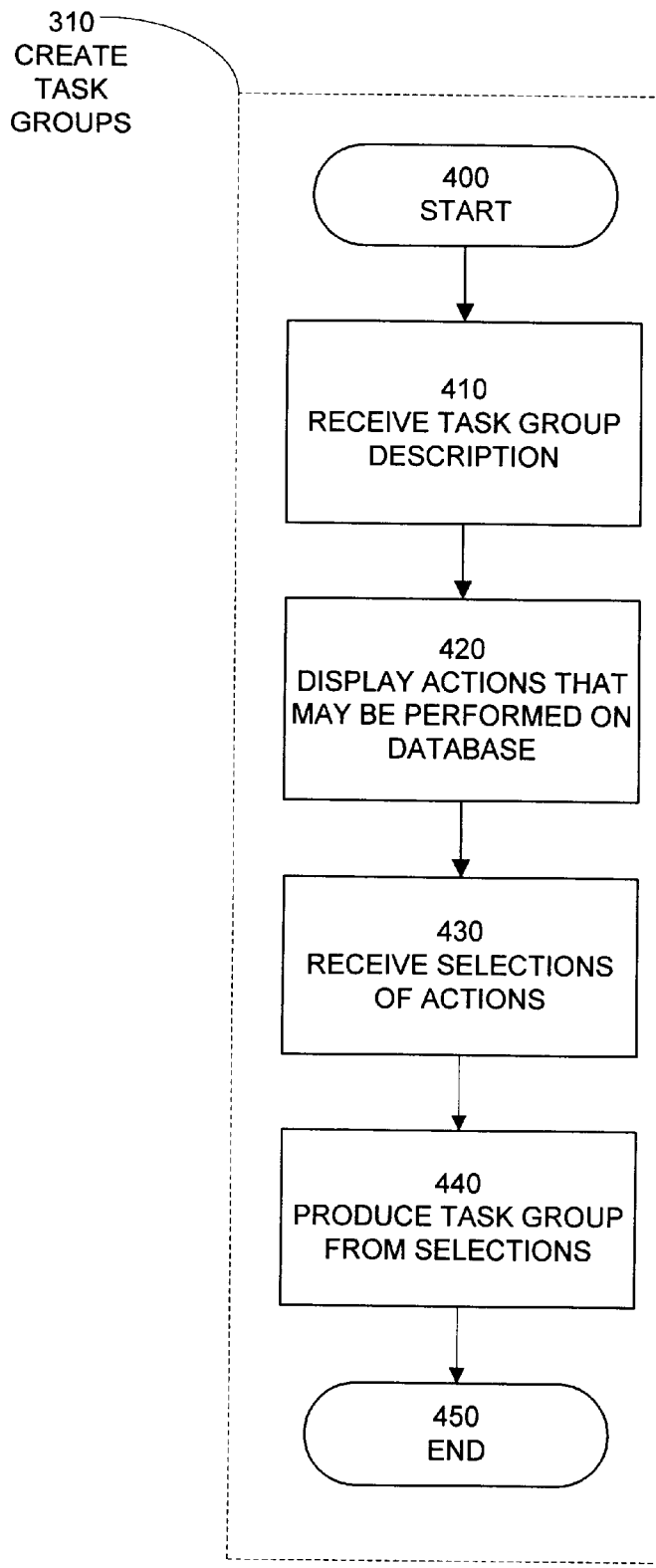
FIG. 4 is a flow chart illustrating some of the operations involved in producing a task group in accordance with an embodiment of the present invention.

FIG. 4 is a flow chart illustrating some of the operations involved in producing a task group in accordance with an embodiment of the present invention. The system starts at state 400, which is a start state. The system next proceeds to state 410. At state 410, the system receives a task group description. In one embodiment, this task group description includes a task group name. The system next proceeds to state 420. At state 420, the system displays actions that may be performed on the database. In one embodiment, the actions displayed for a single task group are restricted to actions from a single business area This limits the scope of a task group to the business area. In another embodiment, the actions are displayed in hierarchical form on a GUI, and the GUI provides a mechanism to navigate through the hierarchy of actions. The system next proceeds to state 430. At state 430, the system receives selections of actions to include in the task group. In one embodiment, this selection process involves receiving selections from a GUI. The system next proceeds to state 440. At state 440, the system creates a task group including the selected actions. The system next proceeds to state 450, which is an end state.

Figure 5:
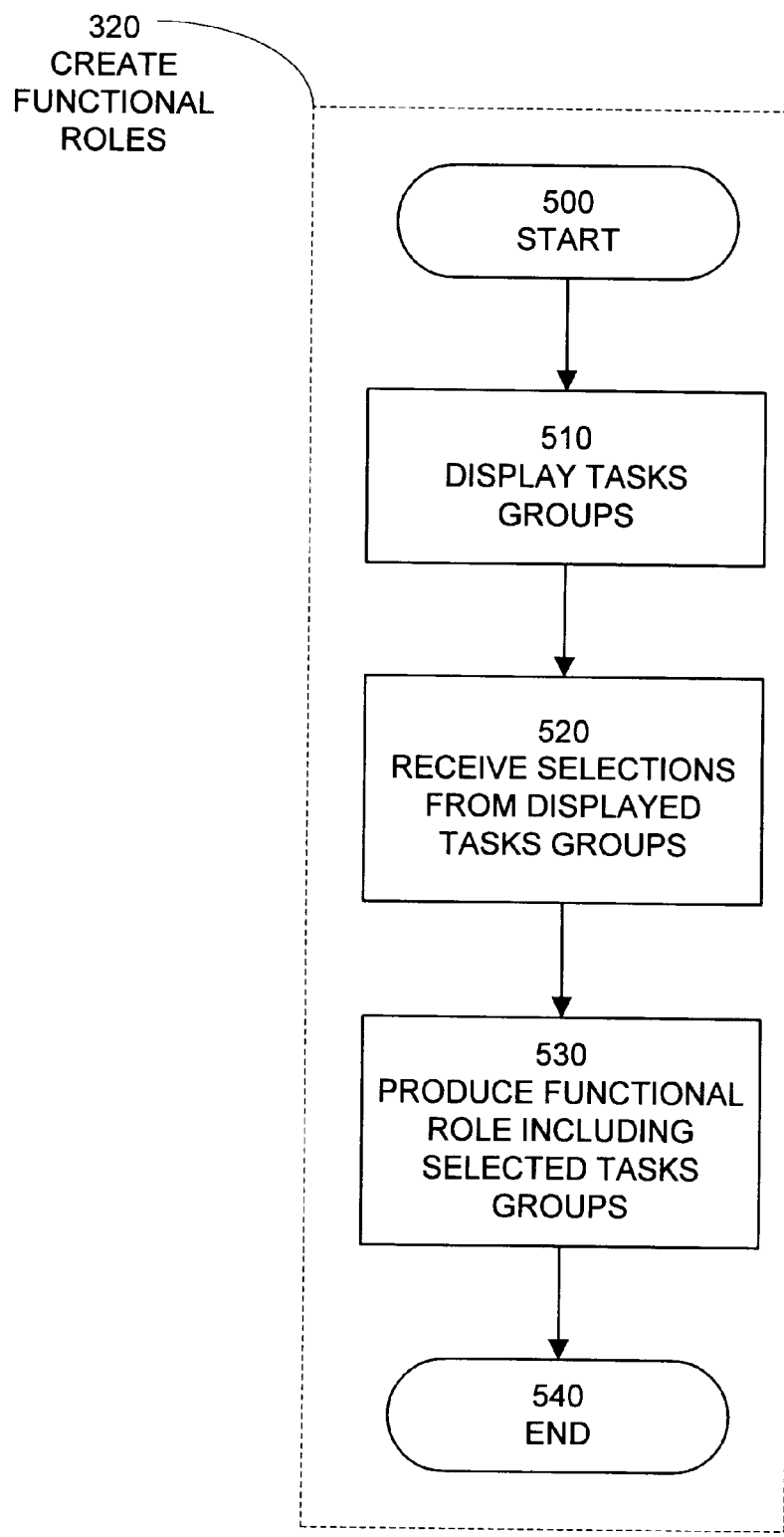
FIG. 5 is a flow chart illustrating some of the operations involved in producing functional roles in accordance with an embodiment of the present invention.

FIG. 5 is a flow chart illustrating some of the operations involved in producing functional roles in accordance with an embodiment of the present invention. The system starts at state 500, which is a start state. The system next proceeds to state 510. At state 510, the system displays task groups that may be included in a functional role. In one embodiment, the task groups are displayed in hierarchical form on a GUI, and the GUI provides a mechanism to navigate through the hierarchy of task groups. The system next proceeds to state 520. At state 520, the system receives selections of task groups to include in the functional role. In one embodiment, this selection process involves receiving selections from a GUI. The system next proceeds to state 530. At state 530, the system creates a functional role including the selected task groups. The system next proceeds to state 540, which is an end state. In one embodiment, each task group is limited to actions involving a single business area, and functional roles allow task groups from different business areas to be combined.

Figure 6:
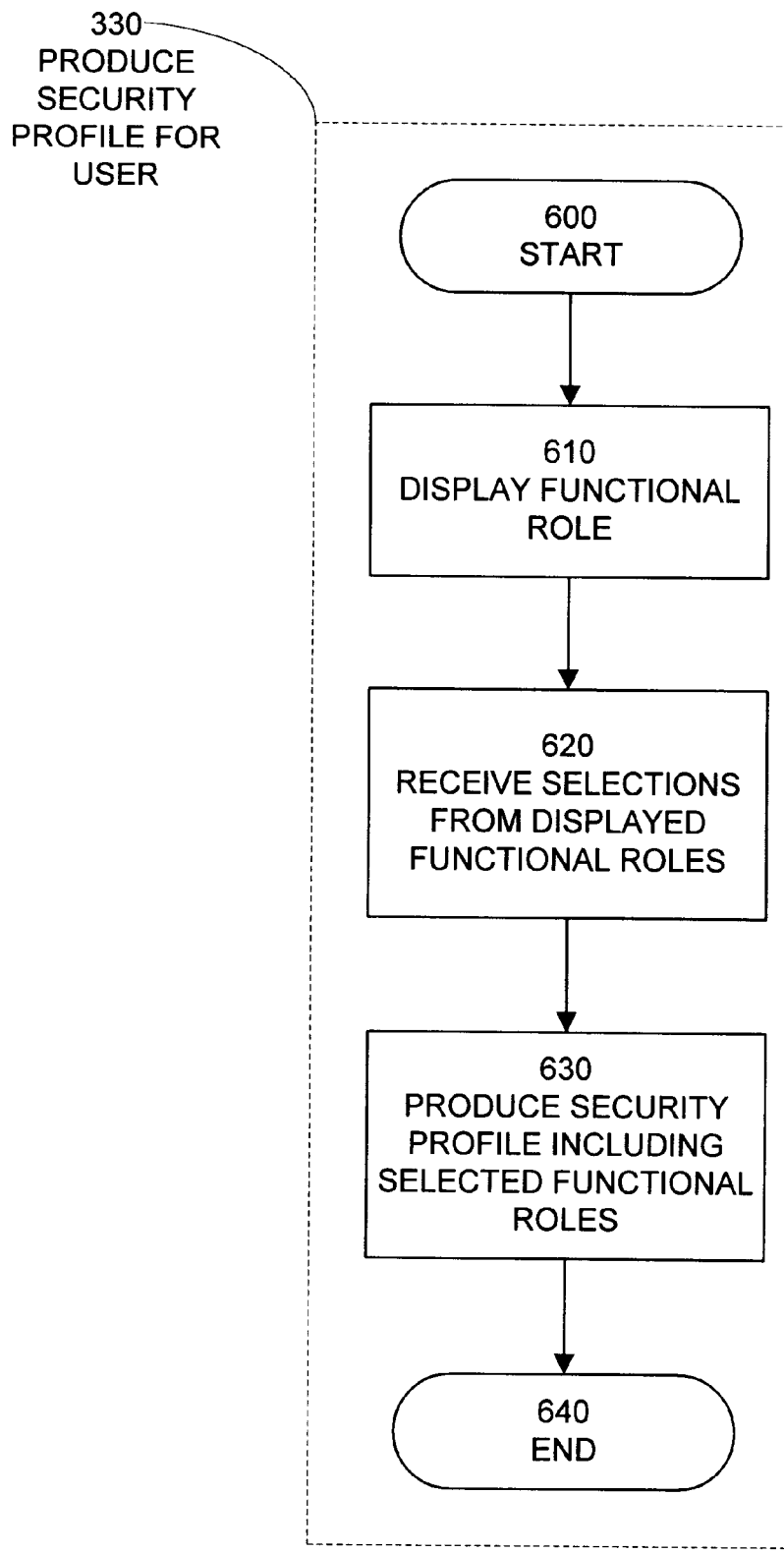
FIG. 6 is a flow chart illustrating some of the operations involved in producing a security profile for a user in accordance with an embodiment of the present invention.

FIG. 6 is a flow chart illustrating some of the operations involved in producing a security profile for a user in accordance with an embodiment of the present invention. The system starts at state 600, which is a start state. The system next proceeds to state 610. At state 610, the system displays functional roles that may be included in a security profile for a user. In one embodiment, the functional roles are displayed in hierarchical form on a GUI, and the GUI provides a mechanism to navigate through the hierarchy of functional roles. The system next proceeds to state 620. At state 620, the system receives selections of functional roles to include in the security profile for the user. In one embodiment, this selection process involves receiving selections from a GUI. The system next proceeds to state 630. At state 630, the system creates a security profile for the user including the selected functional roles. The system next proceeds to state 640, which is an end state.

Description of Data Access Structures

Figure 7:
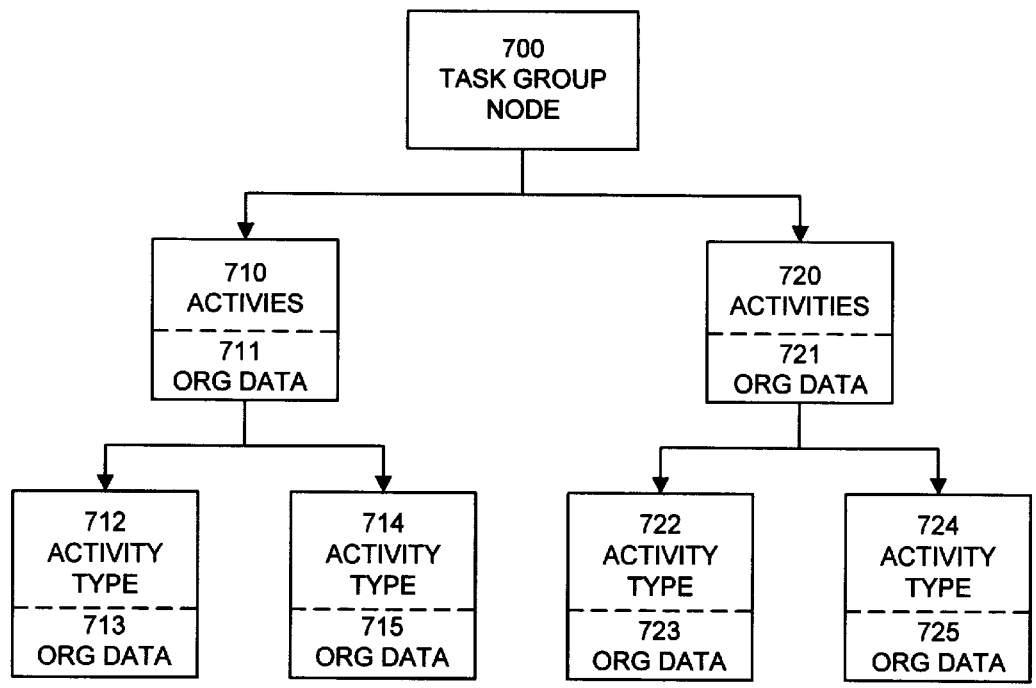
FIG. 7 is a block diagram illustrating some of the major functional components of a task group node structure 700 for storing information relating to a task group in accordance with an embodiment of the present invention.

FIG. 7 is a block diagram illustrating some of the major functional components of a task group node structure 700 for storing information relating to a task group in accordance with an embodiment of the present invention. In this embodiment, task group node 700 includes activities nodes 710 and 720. Activities node 710 connects to activity types 712 and 714, which specify actions that may be performed on a database. Activities node 720 connects to activity types 722 and 724, which also specify actions that may be performed on a database. Nodes 710, 720, 712, 714, 722 and 724 include organizational data components, 711, 721, 713, 175, 723 and 725, respectively. These specify an organizational restriction on the operation of the related activities or activity types. For example, org data 713 may restrict the actions of activity type 712 to accounting functions. Alternatively, org data 713 may restrict the actions of activity type 712 to a specific company location. Another embodiment does not include any organizational data in activities nodes and activity type nodes.

Figure 15:
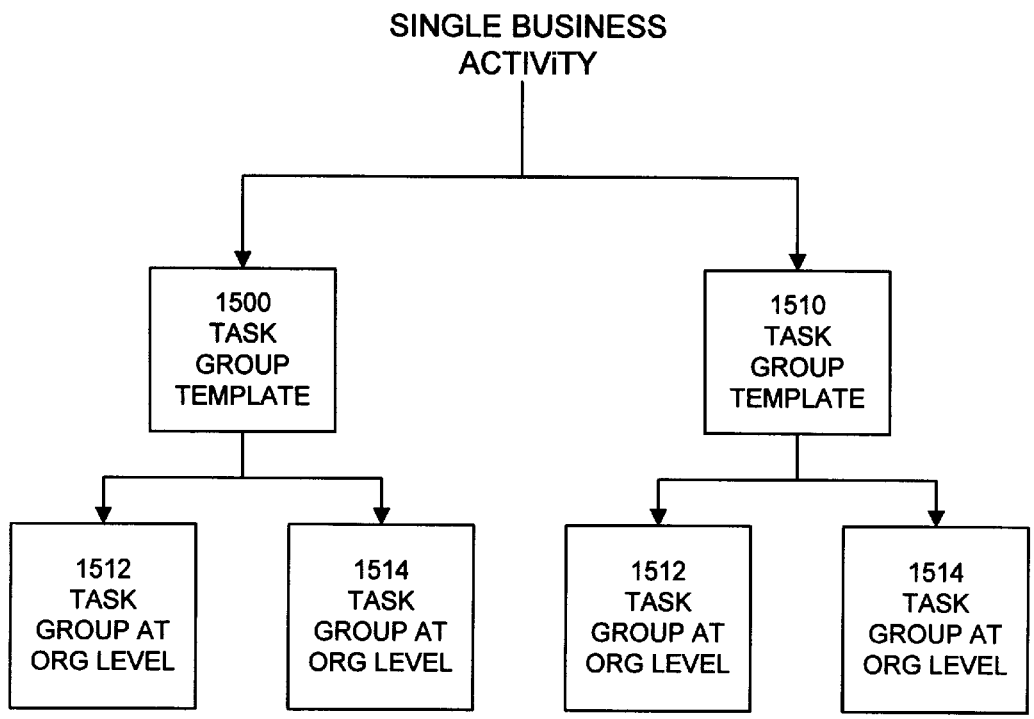
FIG. 15 illustrates how data pertaining to tasks groups is organized in accordance with an embodiment of the present invention.

FIG. 15 illustrates how data pertaining to tasks groups related to a single business activity can be organized in accordance with an embodiment of the present invention. In this example, there are two task group templates 1500 and 1510 under the business activity that specify task groups without any organizational restrictions. These task group templates have associated task groups with organizational restrictions. Task group template 1500 is associated with nodes 1512 and 1514, which specify task groups with organizational restrictions. Task group template 1500 is associated with nodes 1512 and 1514, which specify task groups with organizational restrictions.

Figure 8:
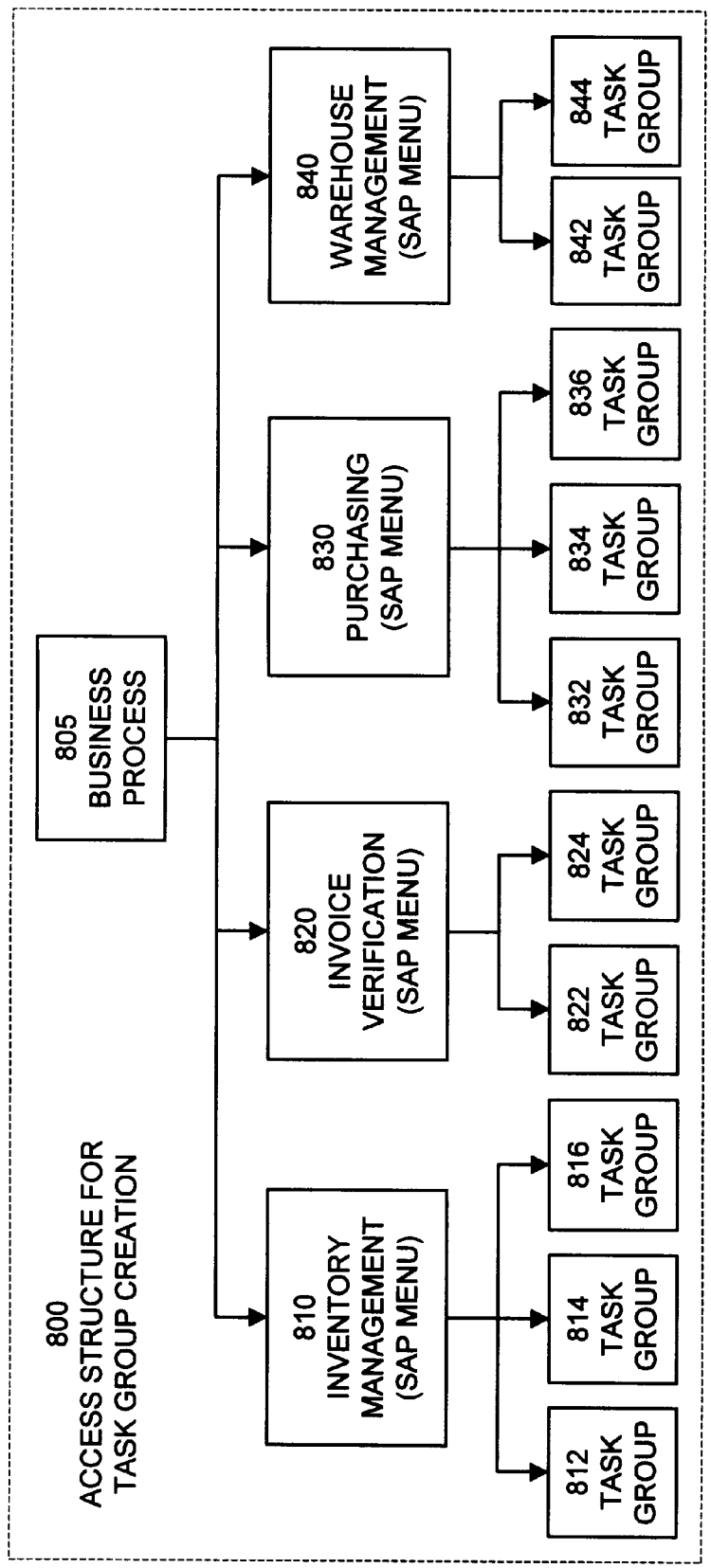
FIG. 8 is a block diagram illustrating some of the major functional components of an access structure for task group creation 800 in accordance with an embodiment of the present invention.

FIG. 8 is a block diagram illustrating some of the major functional components of an access structure for task group production 800 in accordance with an embodiment of the present invention. This access structure is organized hierarchically with business process 805 at the root node. Business process 805 is coupled to a plurality of business activities, including materials management 810, inventory 820, purchasing 830 and production 840. In one embodiment, the database system is a SAP database system, and the business activities are specified by SAP menus. (SAP software is generally available from SAP America, Inc. of Philadelphia, Pa.) In general, business activities are any convenient delineation of activities under business process 805 that allows business process 805 to be compartmentalized into smaller units. Business activities 810, 820, 830 and 840 are in turn coupled to specific task groups. In the illustrated embodiment, inventory management 810 is coupled with task groups 812, 814 and 816; invoice verification 820 is coupled with task groups 822 and 824; purchasing 830 is coupled with task groups 832, 834 and 836; and warehouse management 840 is coupled with task groups 842 and 844. In the illustrated embodiment, task groups are associated with specific business activities because in this embodiment task groups can only include actions associated with a single business activity.

Figure 9:
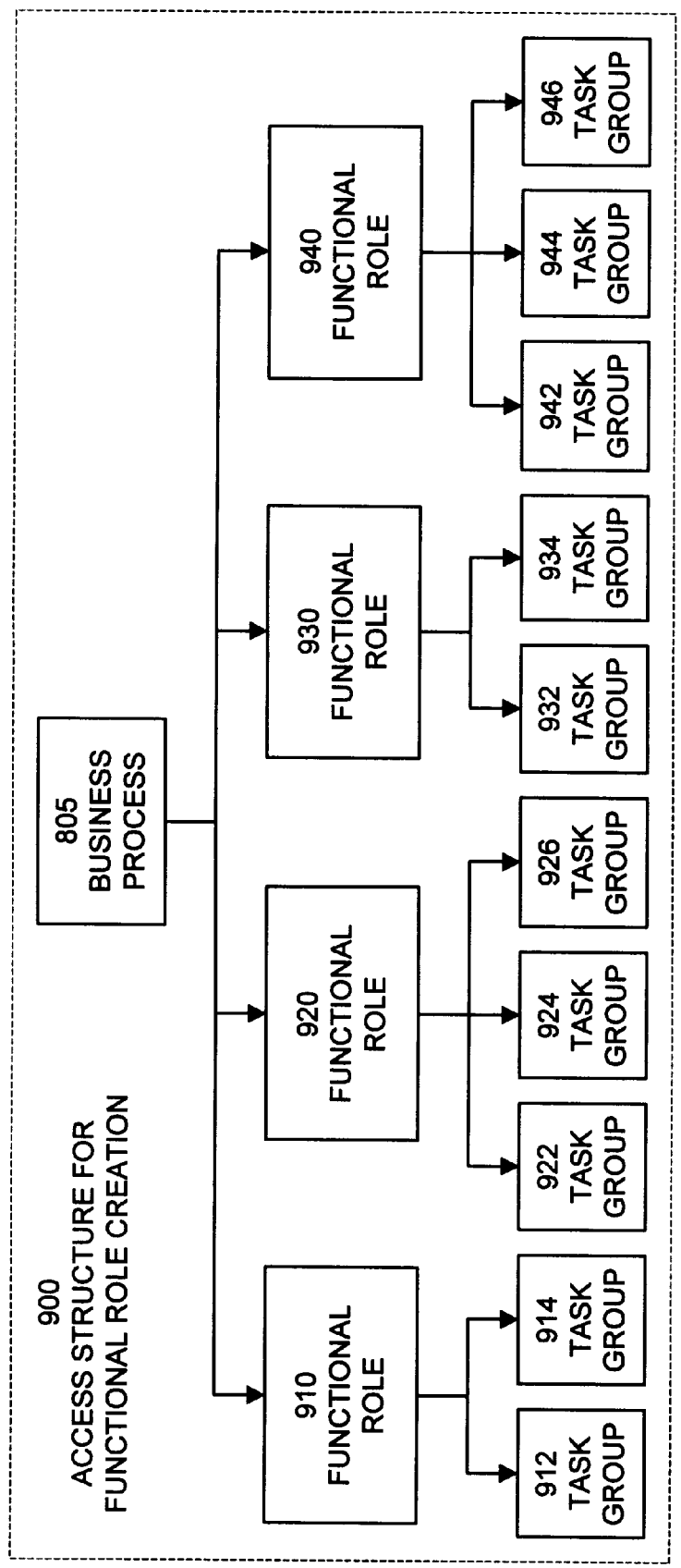
FIG. 9 is a block diagram illustrating some of the major functional components of an access structure for functional role creation 900 in accordance with an embodiment of the present invention.

FIG. 9 is a block diagram illustrating some of the major functional components of an access structure for functional role production 900 in accordance with an embodiment of the present invention. This access structure is organized hierarchically with business process 805 at the root node. Business process 805 is coupled to a plurality of functional roles 910, 920, 930 and 940. Functional roles 910, 920, 930 and 940 are in turn coupled to task groups as follows: functional role 910 is coupled with task groups 912 and 914; functional role 920 is coupled with task groups 922, 924 and 926; functional role 930 is coupled with task groups 932 and 934; and functional role 940 is coupled with task groups 942, 944 and 946.

In one embodiment, task groups are limited to actions within a specific business activity, and functional roles are used to combine task groups from different business activities. For example, business activities may include: inventory management, invoice verification and warehouse management. A single task group may only specify actions within a specific business activity, such as inventory management. In contrast, a functional role may combine tasks groups from different business activities, such as combining a task group from inventory management with a task group from invoice verification.

Figure 10:
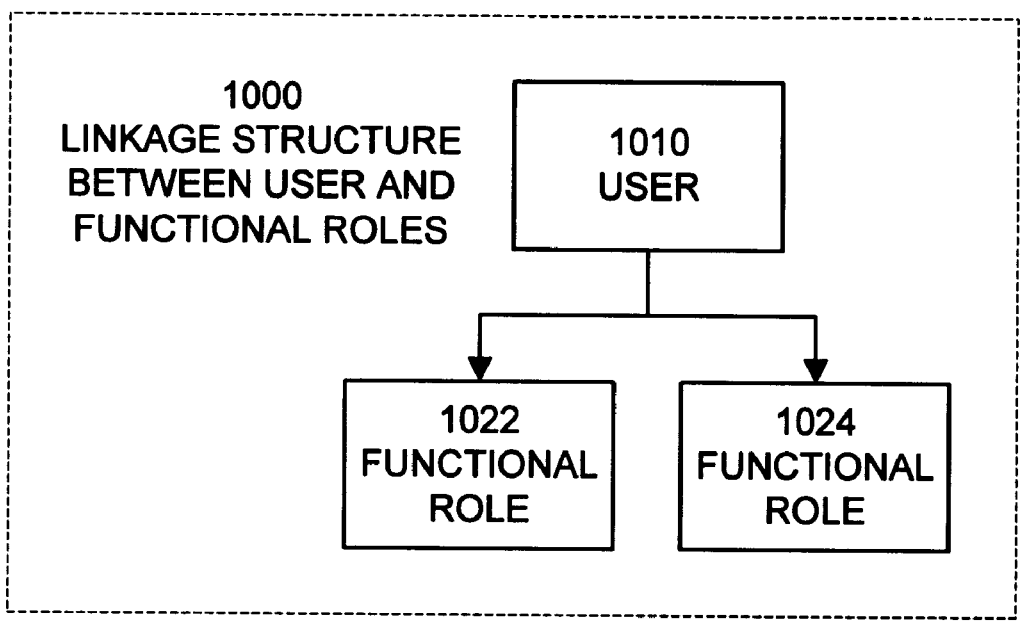
FIG. 10 is a block diagram illustrating linkages 1000 between a user 1010 and a plurality of functional roles 1020, 1022, 1024 and 1026 in accordance with an embodiment of the present invention.

FIG. 10 is a block diagram illustrating a linkage structure 1000 between a user 1010 and a plurality of functional roles 1022 and 1024 and in accordance with an embodiment of the present invention. In the illustrated embodiment, the security profile for user 1010 includes functional roles 1022 and 1024. This means that the security profile for user 1010 includes actions specified in task groups within functional roles 1022 and 1024. In one embodiment, security profiles for users can be created only by combining functional roles. This simplifies management of security by allowing a database security administrator to focus on specifications of functional roles and task groups instead of security profiles for individual users.

FIG. 11 is a diagram illustrating an example of a business functions hierarchy in accordance with an embodiment of the present invention. In this example, the business process is divided into a plurality of business activities, including logistics and accounting. Logistics is divided into materials management, sales/distribution, production, production-process and plant maintenance. Materials management is divided into inventory management, purchasing, invoice verification, service entry, valuation, warehouse management, materials planning, physical inventory, material master, environment data and service master. Sales/distribution is divided into master data, sales support, sales, shipping, transportation, billing, foreign trade and sales information system. Production is divided into master data, SOP, master planning, MRP, production control, capacity planning, repetitive manufacturing, kanban and production costing. Plant maintenance is divided into technical objects, work centers, maintenance task lists, maintenance planning, PM processing and information system. Accounting has a sub-category called financial accounting, which is divided into general ledger, accounts receivable, accounts payable, fixed assets, consolidation and special purpose ledger. Each one of the above-listed areas can function as a separate business activity for which task groups can be created.

Description of Graphical User Interface Screens

FIG. 12 is a diagram illustrating the format for a graphical user interface (GUI) screen for producing task groups in accordance with an embodiment of the present invention. In this embodiment, the screen includes a number of buttons including a create button. Upon activating the create button, a user inputs a task group name and description into the GUI. A new task group is subsequently displayed on the screen.

The screen illustrated in FIG. 12 also includes a change button, which can be activated to initiate changes to the actions associated with a task group. The change button activates the menu options tree, which appears below the menu bar and occupies most of the screen. This menu options tree allows a user to navigate through the hierarchical structure of the tree. A node with a "+", sign indicates that the node includes associated child nodes. When a node with a "+" sign is activated, the children are displayed to the screen, and the "+" sign becomes a "−" sign, indicating that the children are displayed. When a node with a "−" sign is activated, the node closes, and the children are removed from the display, and the display is updated appropriately.

The columns to the right of the tree correspond to individual task groups. In the illustrated example, three task groups appear: "M:POCREATE," "M:PODISPLAY," and "M:TGCREATE." These tasks group labels are abbreviations for, "purchase order create," "purchase order display," and "task group create," respectively. The letter "M" is an abbreviation for materials management. The columns include check boxes for the displayed activity types (or actions). Activity types specify actions that may be performed on the database, and can be selected by activating the corresponding check boxes. When a check box is activated an "x" appears within it The associated rectangles including three circles representing red, yellow and green lights, respectively, from left to right. A green light indicates the corresponding activity type is selected, the red light indicates it is not selected. A yellow light indicates a node is a parent node for which some, but not all, its children are selected. A parent whose children are all selected appears as green, and a parent whose children are not selected appears as red.

The system security administrator uses the display in FIG. 12 to navigate through the activity types and to select activity types in order to include them in task groups. When the user is finished with this selection process, the user can activate a save button to save the task groups to a database that stores the task groups. The screen additionally includes a button that activates display of a list of task groups from which a specific task group can be selected for editing.

In the illustrated embodiment, the screen includes a delete task group button, which can be used to delete a task group if the task group is not being used by within an existing functional role. If is being used within an existing functional role, the security administrator will be prompted with a warning that the task group is in use.

In the illustrated embodiment, the screen additionally includes a copy tasks group button. When this button is activated, the following actions occur: the system receives a new task group name; copies the existing task group to the new task group; and displays the new tasks group to the screen. The screen additionally includes buttons that activate the printing of reports.

FIG. 13 is a diagram illustrating the format for a graphical user interface screen for producing functional roles in accordance with an embodiment of the present invention. The screen illustrated in FIG. 13 operates the same way as the screen illustrated in FIG. 12, except that the screen selects task groups to include in functional roles instead of selecting activity types to include in task groups. The columns, therefore, correspond to functional roles. In the illustrated example there are three functional roles: "M=ERSUPBUY," "M=ERBUYER" and "M=ERPURMGR." These functional role labels are abbreviations for, "supply buyer," "buyer," and "purchasing manager," respectively. Again, the letter "M" is an abbreviation for materials management. The selection tree includes task groups to include in the functional roles. In one embodiment, the database is a SAP database and the task groups are arranged according to a hierarchy based upon SAP menus.

FIG. 14 is a diagram illustrating the format for a graphical user interface screen for producing functional roles in accordance with an embodiment of the present invention. The screen illustrated in FIG. 14 operates the same way as the screen illustrated in FIG. 12, except that the screen is used to select functional roles to assign to users instead of selecting task groups to assign to functional roles. Consequently, the columns correspond to users instead of functional roles, and the selection tree contains functional roles instead of task groups. In the illustrated example there are three users, "USER1," "USER2," and "USER3."

Description of How the Graphical User Interface Screens Are Used

The set of security tools illustrated in FIG. 2 operate on application servers, such as application servers 122 and 124 from FIG. 1. These security tools include a tool to produce a security profile 210. As illustrated in FIG. 3, this tool performs operations including: producing tasks groups, producing functional roles and producing a security profile for a user. Each of the three above-listed operations are associated with individual GUI screens, illustrated in FIGS. 12, 13 and 14, respectively.

The GUI screen illustrated in FIG. 12 is designed to assist a security administrator in producing task groups. It operates on the access structure for task group production 800 illustrated in FIG. 8. This GUI screen allows a security administrator to navigate through various business activities, such as inventory management 810, invoice verification 820, purchasing 830 and warehouse management 840, under business process 805 within access structure 800. It allows a security administrator to select activity types to include in a task group within a selected business activity.

The GUI screen illustrated in FIG. 13 is designed to assist a security administrator in producing functional roles. It operates on the access structure for functional role production 900 illustrated in FIG. 9. This GUI screen allows a security administrator to navigate through task groups, and to select task groups to include in a functional role within access structure 900.

The GUI screen illustrated in FIG. 14 is designed to assist a security administrator in producing a security profile for a user. For a given user, it produces the linkage structure between user and functional roles 1000 illustrated in FIG. 10. This GUI screen allows a security administrator to navigate through functional roles, and to select functional roles to include in the security profile for the user in linkage structure 1000.

Definitions

Action: a function that can be performed on a database. This includes, but is not limited to, inserting, modifying, deleting, and retrieving database entries. An action may be limited to a function performed on a particular type of data.

Activity type: same as action.

Business process: descriptor for the highest level function of a business, which includes all database functions performed by the business.

Business activity: any convenient category for a sub-unit or sub-area of a business. For example, a business area may include categories such as accounting, inventory and purchasing.

Functional role: a collection of actions that may be performed on a database. In one variation, a functional role is composed of task groups, which themselves specify actions that may be performed on the database.

Organizational unit: Any convenient sub-unit of a business. This includes, but is not limited to geographical and functional sub-units of a business.

SAP: identifier for products of SAP Technology, Inc.

Security administrator: a person in charge of maintaining security in a computer or database system.

Security profile: a collection of actions a user is allowed to perform on a database.

Task group: a collection of actions that can be performed on a database.

The foregoing description of embodiments of the invention has been presented for purposes of illustration and description only. They are not intended to be exhaustive or to limit the invention to the forms disclosed. Obviously, many modifications and variations will be apparent to practitioners skilled in the art

What is claimed is:

1. A graphical user interface for manipulating task groups, the task groups including actions that may be performed on a database system, comprising:

a graphical display;

a first activation point on the graphical display, for activating creation of a task group;

a second activation point on the graphical display, for activating changes to a task group; and a display within the graphical display, for displaying a plurality of actions that may be performed on the database, including activation points for activating actions to be included in the task group;

wherein the display within the graphical display includes a mechanism for specifying organizational units within a business that the task groups may operate on.

2. The graphical user interface of claim 1, wherein activation points are activated by placing a cursor over an area of a computer monitor that corresponds to the activation point, and selecting the activation point by pressing a button.

3. The graphical user interface of claim 1, including a third activation point on the graphical user interface, for activating deletion of a task group.

4. The graphical user interface of claim 1, including a fourth activation point on the graphical user interface, for activating copying of a first task group to a second task group.

5. The graphical user interface of claim 1, wherein the display of actions is organized in a hierarchical structure, and includes a mechanism to navigate through the hierarchical structure in order to display actions that may be performed on the database.

6. The graphical user interface of claim 1, including a linkage to a database for storing task groups.

7. The graphical user interface of claim 1, wherein the display within the graphical display includes actions that may be performed on the database related to a single business activity.

8. The graphical user interface of claim 1, wherein the plurality of actions specify actions performed on a SAP database.

9. The graphical user interface of claim 1, wherein the plurality of actions specify actions performed on a SAP database.

10. A graphical user interface for manipulating a functional role for users of a database system, the functional role including actions that may be performed on a database system, comprising:

a graphical interface including a first screen and a second screen;

a first activation point on the first screen, for activating creation of a functional role;

a second activation point on the first screen, for activating changes to a functional role;

a display of task groups within the first screen, the task groups specifying actions that may be performed on the database, the display including activation points for activating task groups to be included in the functional role;

a third activation point on the second screen, for activating creation of a task group;

a fourth activation point on the second screen, for activating changes to a task group; and a display within the second screen, for displaying a plurality of actions that may be performed on the database, including activation points for activating actions to be included in the task group;

wherein the display within the second screen includes a mechanism for specifying organizational units within a business that the task groups may operate on.

11. The graphical user interface of claim 10, wherein activation points are activated by placing a cursor over an area of a computer monitor that corresponds to the activation point, and selecting the activation point by pressing a button.

12. The graphical user interface of claim 10, including a fifth activation point on the first screen, for activating deletion of a functional role.

13. The graphical user interface of claim 10, including a sixth activation point on the first screen, for activating copying of a first functional role to a second functional role.

14. The graphical user interface of claim 10, wherein the display of task groups is organized in a hierarchical structure, and includes a mechanism to navigate through the hierarchical structure in order to display the task groups.

15. The graphical user interface of claim 10, including a linkage to a database for storing functional roles.

16. The graphical user interface of claim 10, wherein the task groups specifying actions that may be performed on a SAP database.

17. A graphical user interface for manipulating a security profile for a user of a database system, the security profile including actions that may be performed on the database system by the user, the graphical user interface comprising:

a graphical interface including a first screen and a second screen;

a first activation point on the first screen, for activating creation of a security profile for the user;

a second activation point on the first screen, for activating changes to a security profile for the user; and a display of functional roles within the first screen, the functional roles specifying actions that may be performed on the database, the display including activation points for activating functional roles to be included in the security profile for the user;

a third activation point on the second screen, for activating creation of a task group;

a fourth activation point on the second screen, for activating changes to a task group; and a display within the second screen, for displaying a plurality of actions that may be performed on the database, including activation points for activating actions to be included in the task group;

wherein the display within the second screen includes a mechanism for specifying organizational units within a business that the task groups may operate on.

18. The graphical user interface of claim 17, wherein activation points are activated by placing a cursor over an area of a computer monitor that corresponds to the activation point, and selecting the activation point by pressing a button.

19. The graphical user interface of claim 17, including a fifth activation point on the first screen, for activating deletion of a security profile for the user.

20. The graphical user interface of claim 17, including a sixth activation point on the first screen, for activating copying of a first security profile to a second security profile.

21. The graphical user interface of claim 17, wherein the display of functional roles is organized in a hierarchical structure, and includes a mechanism to navigate through the hierarchical structure in order to display the functional roles.

22. The graphical user interface of claim 17, including a linkage to a database for storing security profiles.

23. The graphical user interface of claim 17, wherein the functional roles specify actions that may be performed on a SAP database.

24. A computer readable storage medium storing instructions that when executed by a computer implement a graphical user interface for manipulating task groups, the task groups including actions that may be performed on a database system, the graphical user interface comprising:

a graphical display;

a first activation point on the graphical display, for activating creation of a task group;

a second activation point on the graphical display, for activating changes to an existing task group; and a display within the graphical display, for displaying a plurality of actions that may be performed on the database, including activation points for activating actions to be included in the task group;

wherein the display within the graphical display includes a mechanism for specifying organizational units within a business that the task groups may operate on.

25. A computer readable storage medium storing instructions that when executed by a computer implement a graphical user interface for manipulating a functional role for users of a database system, the functional role including actions that may be performed on a database system, the graphical user interface comprising:

a graphical interface including a first screen and a second screen;

a first activation point on the first screen, for activating creation of a functional role;

a second activation point on the first screen, for activating changes to a functional role;

a display of task groups within the first screen, the task groups specifying actions that may be performed on the database, the display including activation points for activating task groups to be included in the functional role;

a third activation point on the second screen, for activating creation of a task group;

a fourth activation point on the second screen, for activating changes to a task group; and a display within the second screen, for displaying a plurality of actions that may be performed on the database, including activation points for activating actions to be included in the task group;

wherein the display within the second screen includes a mechanism for specifying organizational units within a business that the task groups may operate on.

26. A computer readable storage medium storing instructions that when executed by a computer implement a graphical user interface for manipulating a security profile for a user of a database system, the security profile including actions that may be performed on the database system by the user, the graphical user interface comprising:

a graphical interface including a first screen and a second screen;

a first activation point on the first screen, for activating creation of a security profile for the user;

a second activation point on the first screen, for activating changes to a security profile for the user;

a display of functional roles within the first screen, the functional roles specifying actions that may be performed on the database, the display including activation points for activating functional roles to be included in the security profile for the user;

a third activation point on the second screen, for activating creation of a task group;

a fourth activation point on the second screen, for activating changes to a task group; and a display within the second screen, for displaying a plurality of actions that may be performed on the database, including activation points for activating actions to be included in the task group;

wherein the display within the second screen includes a mechanism for specifying organizational units within a business that the task groups may operate on.

\* \* \* \* \*